MAGNETIC CORE DATA STORAGE MATRIX

Filed March 13, 1962 2 Sheets-Sheet 1

INVENTOR
PETER GEORGE BRIGGS
BY Kane and Nydick
ATTORNEYS

Nov. 7, 1967 P. G. BRIGGS 3,351,921

MAGNETIC CORE DATA STORAGE MATRIX

Filed March 13, 1962 2 Sheets-Sheet 2

INVENTOR
PETER GEORGE BRIGGS

BY Hane and Nydick

ATTORNEYS

United States Patent Office 3,351,921

Patented Nov. 7, 1967

3,351,921

MAGNETIC CORE DATA STORAGE MATRIX

Peter George Briggs, Tewin, near Welwyn, England, assignor to International Computers and Tabulators Limited Filed Mar. 13, 1962, Ser. No. 179,306
Claims priority, application Great Britain, Mar. 20, 1961, 10,038/61
10 Claims. (Cl. 340—174)

This invention relates to data storage apparatus.

In data processing apparatus it is often desired to modify stored data. For example, in arithmetic operations when digits of data are in a different radix from the inherent radix of the code notation by which the digits are represented each digit is inspected to determine whether it is necesary to add a filler to make the digit lie within its radix. Also when editing data which is to be printed it is often desired to replace a digit by a decimal point or other symbol and the data is first inspected and then modified. Hitherto in serially operating data processing apparatus modifications of digits in a word or item of data necessitated twice reading out from the storage apparatus the entire word to be processed or in the case of modifying the result of an arithmetic operation it was necessary to temporarily store the unmodified result while a test was made to determine whether a filler was needed.

Processing an entire word twice or providing temporary storage means is obviously undesirable.

According to the present invention data storage apparatus for storing a multi-digit item of data includes a storage location for each digit of the item of data, scanning means arranged to scan all the storage locations containing the digits of the item, the storage locations being scanned one in each of a succession of time intervals to effect in a single time interval reading out a stored digit from the location currently being scanned and writing in a digit into the same storage location, the scanning means being operable to scan a selected storage location in each of two consecutive time intervals.

According to another aspect of the invention data storage apparatus for storing a multi-digit item of data includes a storage location for each digit of the item of data, scanning means arranged to scan all the storage locations containing the digits of the item, the storage locations being scanned one in each of a succession of time intervals to effect in a single time interval reading out a stored digit from the location currently being scanned, applying said read out digit to the input of data processing means and writting an output digit from the data processing means into the same storage location, the scanning means being operable to scan a selected storage location in each of two consecutive time intervals to effect in each of said consecutive time intervals reading out a digit from the selected location and applying said digit to the data processing means and writing an output digit from the data processing means into the same storage location.

Figure 1:
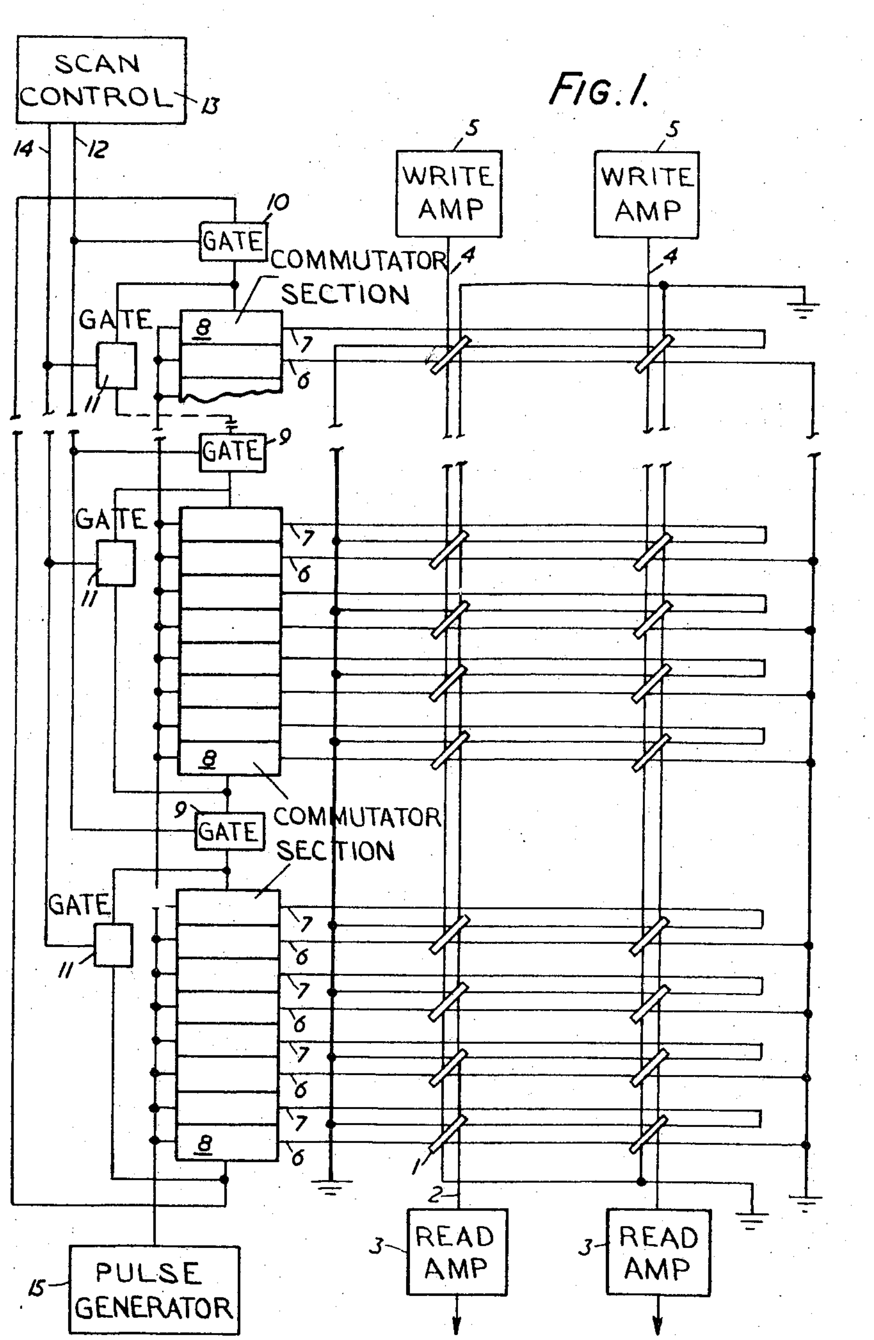
Figure 2:
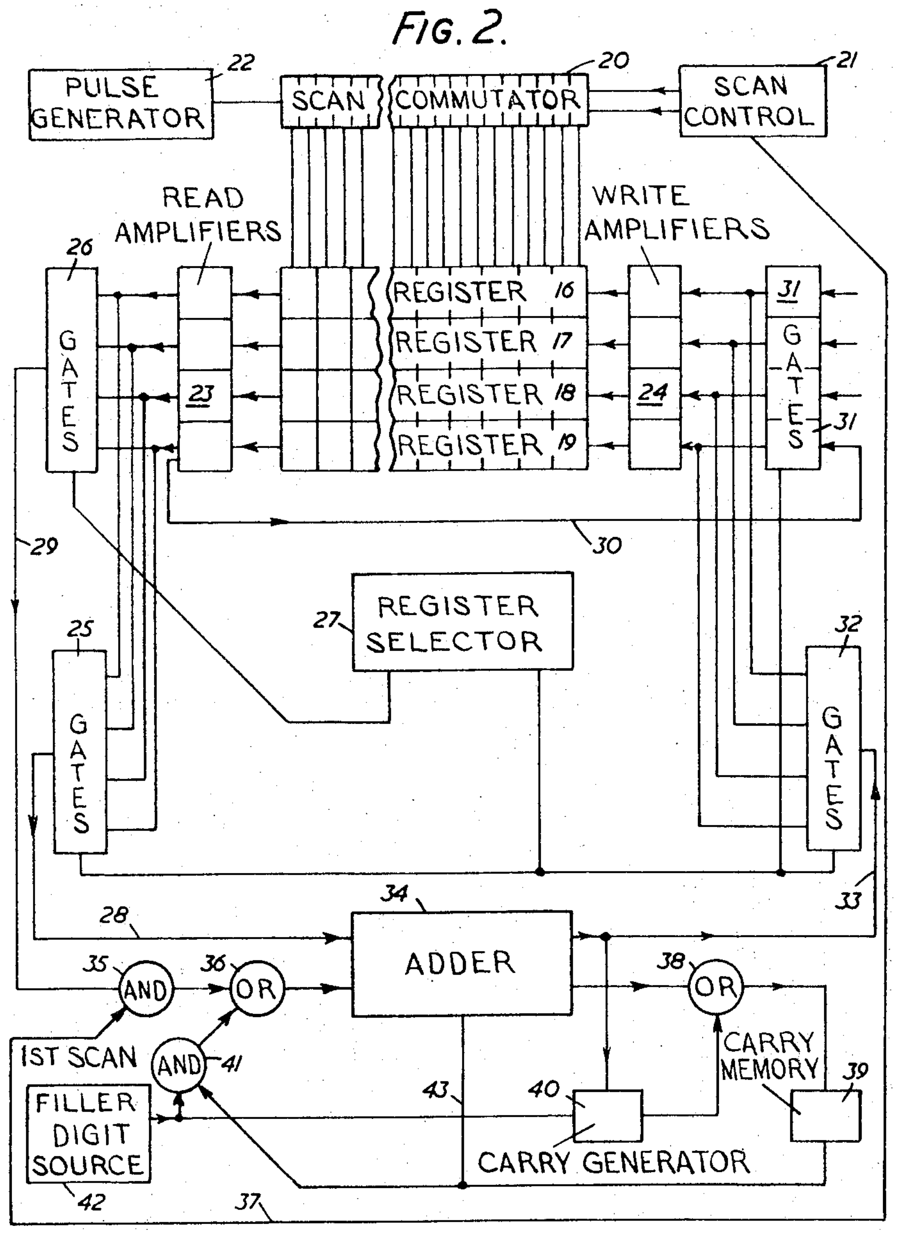

An embodiment of the present invention will be described hereinafter, by way of example, with reference to the accompanying drawings in which:

FIGURE 1 is a diagram of a part of a magnetic core store arranged according to the present invention and FIGURE 2 is a diagram of a data processing apparatus including the magnetic core store according to the present invention associated with an arithmetic unit.

Referring to FIGURE 1, a magnetic core store consists of a plurality of bistable magnetic cores 1, arranged in rows and columns. Each column of cores provides a storage register capable of storing one item of data. In this embodiment each digit of an item of data is represented in a binary coded form having four bits of values 1, 2, 4 and 8 respectively. Therefore a group of four cores is provided for storage of each digit, each core of th group being utilised for storing one bit of the code. If i is desired to represent the digits by other codes having a different number of bits, the groups contain a correspond ing number of cores. The cores in a row store like bits o digits of like denominational significance. Thus, in FIG URE 1, the group of four cores at the bottom of eacl column provide storage locations for the least significan digit of each item of data, the 4 rows of cores from th bottom storing the 1, 2, 4 and 8 value digits respectively For clarity, only two groups are shown in full and onl the last rows of the last group are shown. Also only tw columns are shown for storing two items of data. How ever, a larger number of columns may be provided fo storing more items of data. Each column of cores i threaded by a separate sense wire 2 connected to the in put of a read amplifier 3 and is also threaded by a sepa rate word write wire 4 connected to the output of a writ amplifier 5. Each row of cores is threaded by a scan rea wire 6 and a scan write wire 7.

Initially, when no data is stored all the cores 1 are i the unset state representing binary "0." A binary "1" bi of a digit is entered into a selected core by concurren energisation of the word write wire 4 and the scan writ wire 7, threading the selected core by means of so calle "half currents" of a value which in combination are suffi cient to switch the selected core to the set state represent ing binary 1, but which individually are insufficient t switch any others of the cores. Data stored in a core i read out by energising the scan read wire 6 threadin that core by a current of value such that if the core is i the "1" state it is reset to the "0" state and induces a voltage pulse on the sense wire 2. If the core is in th "0" state, energisation of the scan read wire 6 does no swtich the core and therefore no pulse is induced in th sense wire. Since the scan read wires thread all the core in a row, all these cores are sensed concurrently, an therefore concurrent outputs are produced on all the sens lines 2.

An electronic scan commutator distributes energisin currents to the scan read wires 6 and scan write wires 7 The commutator consists of a number of sections 8 cor responding to the digit storage locations and connecte in series by a number of gates 9. The sections 8 eacl consists of an eight stage stepping register in which eacl stage has a scan output terminal connected thereto. Th scan read wires are connected to the terminals of od stages and the scan write wires 7 are connected to th terminals of even stages. A gate 10 connects the last stag of the last section 8 back to the first stage of the firs stage of the first section 8, and a further gate 11 is pro vided for each section 8 connecting the last stage of a section back to the first stage of the same section. Opera tion of the gates 9 and 10 is controlled by signals on lin 12 from a scan control 13 and the operation of the gate 11 is controlled by signals on line 14 from the scan con trol. The scan control 13 is operable to open either al the gates 9 and gate 10 or all the gates 11.

At the start of operation of the commutator the firs stage of the first section 8 i.e. the bottom stage of th bottom section in FIGURE 1 is switched to a set condi tion. This may be accomplished by a start pulse applie to the first stage. A shift pulse generator 15 applies shif pulses to all the stages of the commutator and the firs shift pulse causes the set condition of the first stage t be stepped on to the second stage. Subsequent shift pulse cause the set condition to be progressively stepped alon the first section. If the gates 9 are open, further shif pulses cause the set condition to be progressively steppe along the stages of each section in sequence. When th set condition is at the last stage of the commutator an ne gate 10 is open, the set condition is recirculated back o the first stage of the commutator by the next shift ulse. However, if the gates 9 are closed and gates 11 re open the set condition is recirculated around one ection of the commutator. Thus, by appropriate operaon of the gates 9 and 11 the set condition may be reirculated around a section for a specified number of times nd then transferred to the next section.

When an odd stage of the commutator is in the set ondition, it energises the scan read wire which is conected thereto by a current pulse of sufficient magnitude o reset any cores which are in the "1" state, and thereby roduce output signals on sense wires 2. The even stages f the commutator when in the set condition are arranged o energise the scan write wires 7 with a so called "half urrent." Thus, as the set condition is stepped along a ection 8 of the commutator, the corresponding rows of ores are scanned and subjected in turn to a read/write ycle. The data stored in a row of cores is read out in he first part of the cycle and in the second part of the ycle data is entered into that row of cores by energising he word write wires 4 during the write cycle. By proiding recirculation loops from the output of the read mplifiers 3 to the input of the write amplifiers 5 data read rom a core in the read cycle may be written back into he same core in the immediately succeeding write cycle hereby preserving the data.

Referring now to FIGURE 2, a core store as described ereinbefore as indicated by storage registers 16, 17, 18 nd 19. The scan commutator 20 is controlled by scan ontrol 21 and operated by a shift pulse generator 22. Read amplifiers 23 and write amplifiers 24 are provided or each storage register. The outputs of read amplifiers 23 are connected to a highway gating circuit 25 and to a ighway gating circuit 26. The gating circuits 25 and 26 re controlled by a register selector 27, which may be plugboard, to pass the outputs from selected registers n to the highways 28, 29 respectively. The outputs of ead amplifiers 23 are also connected through recircuation loops 30 provided for each register 16, 17, 18 and 19 only the loop for register 19 being shown) and gating ircuits 31 to the write amplifiers 24. The gating circuits 31 are operated by the register selector 27 in a manner uch that, with the exception of the gate 31 for that register which is connected by gating circuit 25 to the highvay 28, the gates 31 are open so as to recirculate and hereby preserve the data stored in all the remaining registers.

A further highway gating circuit 32 is provided for ntry of data from a highway 33 into a storage register nd is so operated by the selector 27 that data is entered nto that register which is connected to the highway 28.

The highway 28 is connected directly to one input of n adder 34 and the highway 29 is connected through an AND gate 35 and an OR gate 36 to the other input of he adder 34. The scan control 21 is operated to cause he set condition of the commutator stages to recirculate wice round each section of the commutator in turn. The olumns of cores in a group providing a digit storage ocation are therefore sequentially subjected to a first ead/write cycle during the first scan of the digit storage ocation and sequentially subjected to a second read/write ycle during the second scan of that storage location.

During the first scan of a digit storage location the bits f a digit of a first item of data stored in that register onnected to highway 28 are read out sequentially and ed to one input of the adder 34. Also, the scan control perates through line 37 to open the AND gate 35 durng the first scan and therefore the bits of a second item f data stored in the register connected to the highway 29 are read out sequentially and fed to the other input of he adder 34. The adder generates an output signal, repreenting the sum of pairs of digits, which is passed by highvay 33 to the write amplifier associated with the register toring the first item of data whereby the digits of the first item of data are progressively replaced by digits of the sum. The addition of the bits is effected serially and if a carry is generated, it is then delayed and added by the adder during the summation of the bits of next higher significance. If the sum of two digits generates a carry to the digit of next higher significance, a carry representing signal is produced by the adder 34 and is fed through an OR gate 38 to a digit carry memory 39. The memory stores the carry signal during the second scan of the digit location and applies a carry signal to the adder on line 43 in the first scan of the digits of next higher significance.

The outputs of the items of data may have different radices which may also be different from the inherent radix of the code in which the digits are represented. Therefore the sum of two digits may require correction to ensure that the sum digit value is to the correct radix. For example, if the digits are in decimal notation and the inherent radix of the code is 16 an uncorrected sum is produced if it exceeds 9. A sum which exceeds 9 is connected by adding a filler digit of value 6. Therefore the sum output from adder 34 is applied to a carry generator 40 together with the required filler digit generated by a source 42. The carry generator produces a carry signal if the sum of the uncorrected sum from the adder 34 and the filler digit exceeds 15 and this carry signal is passed through OR gate 38 to carry memory 39. Thus if the sum of the two digits exceeds 15 adder 34 applies a carry signal to the memory 39 and if the sum of the digits is greater than 9 but less than 16, the carry generator 40 passes a carry signal to memory 39.

During the second scanning of the digit storage location the gate 35 is closed, and therefore only the uncorrected sum digit is fed to the first input of the adder 34. The memory 39, if it is storing a carry signal, opens a gate 41 to allow the filler digit from the source 42 to pass through the OR gate 36 to the second input of the adder. The filler digit is therefore added to the uncorrected sum digit in the adder which finally produces a corrected sum output. The corrected sum is then entered into the store into that location in which the uncorrected sum was stored. If the memory 39 is not storing a carry the gate 41 remains closed and thus the filler digit is not entered into the adder. Therefore, the uncorrected sum in the storage register is merely recirculated through the adder.

If desired the commutator may be controlled by the scanning control in dependence upon the memory 39 so as to effect a double scan of a digit if a carry is stored and to effect only a single scan of a digit if no carry is stored thereby preventing an unnecessary second scan and economising on the time required for the data processing operation.

Whilist the storage device has been described in connection with the correcting of arithmetic sums it may also be advantageously utilised when it is desired to modify data particularly where it is necessary to examine the data prior to modification. Thus the data may be read out digit by digit, each digit being examined in turn and then written back into the store. If modification is required, the digit is read out a second time and the modified digit is written into the store.

I claim:

1. Data storage apparatus for storing a multi-digit item of data, including a plurality of storage locations, one for each digit, respectively, of the item; scanning means operative to scan said locations in sequence in a succession of time intervals to effect in each of said time intervals the reading-out of the digit stored in the location being scanned and the writing-in of a digit into the same location; and means operable to modify the operation of said scanning means to cause said scanning means to repeat the scanning of a location before scanning the next location in the sequence.

2. Data storage apparatus for storing a multi-digit item of data to be processed by a data processor, including a plurality of storage locations, one for each digit, respectively, of the item; scanning means operative to scan said locations in sequence in a succession of time intervals to effect in each of said time intervals the reading-out of the digit stored in the location being scanned, the application of the digit to the data processor and the writing of a digit from the data processor into the same location; and means operable to modify the operation of said scanning means to cause said scanning means to repeat the scanning of a location before scanning the next location in the sequence.

3. Data storage apparatus for storing a multi-digit item of data, including a plurality of groups of storage elements, one group corresponding to each digit, respectively, of the item, each element of a group being effective to store a code component of the corresponding digit; scanning means operative to scan the elements of a group in sequence, a single scanning of an element being effective to cause the reading-out of the code component stored in the element and the writing of a code component into the same element, first control means connected to said scanning means and operable to cause said scanning means to scan said groups in sequence; second control means connected to said scanning means and operable to cause said scanning means to repeat the scanning of a group of elements; and means to operate said first and second control means selectively.

4. Data storage apparatus for storing multi-digit data items to be processed by a data processor, including first and second storage devices effective to store digits of first and second multi-digit data items, respectively, each of said storage devices including a plurality of storage locations, one location corresponding to each digit, respectively, of the respective item; scanning means operative to scan the storage locations in sequence in a succession of time intervals to effect in each of said time intervals the reading of digits of like significance from locations of the two storage devices for application to the data processor and the writing of digits from the data processor into the same locations; and means operable to modify the operation of said scanning means to cause said scanning means to repeat the scanning of a location before scanning the next location in the sequence.

5. Data storage apparatus for storing a multi-digit item of data, including a plurality of groups of storage elements, each group corresponding, respectively, to a different digit of the item and each element of a group being effective to store a code component of the corresponding digit; a succession of shifting registers each corresponding to one of said groups, respectively, and each coupled to the elements of the corresponding group to scan the elements of said group in turn to effect, in a single scanning of an element, the reading-out of the code component stored in said element and the writing of a code component into the same element; first gating means connected between adjacent registers in the succession and operable to cause the registers to scan the groups in turn; second gating means connected to said registers and operable to cause the scanning of any one of said groups to be repeated by the corresponding register; and means to operate said first and second gating means selectively.

6. Data storage apparatus according to claim 5, in which each said storage element comprises a bi-stable magnetic core.

7. Data storage apparatus, including first and second groups of bistable magnetic cores; a first shifting register having a succession of pairs of stages, one pair coupled to each core, respectively, of said first group; a second shifting register having a succession of pairs of stages, one pair coupled to each core, respectively, of said second group, the two stages of each pair in said registers being switchable to a set state in turn to apply a setting magnetic field and a resetting magnetic field, respectively, to the corresponding core; first gating means operable to connect the first stage of the second register to the last stage of the first register; second gating means operable to connect the last stage of each register back to the first stage of the same register; means to progress said set state through said stages in sequence; and two-state control means effective in one state to operate said first gating means to allow said set state to progress from said first register to said second register and effective in the other state to operate said second gating means to cause said set state to be recirculated through a register.

8. Data storage apparatus, including first and second storage devices for storing first and second multi-digit items of data, respectively, each device having first and second groups of storage elements, each first group being effective to store a digit of first significance of the corresponding item and each second group being effective to store a digit of second significance of said corresponding item, corresponding elements in said two devices being effective to store code components of like denominational significance of said digits; an adder connected to the two devices; means to scan the elements sequentially in order of significance, the elements in said two devices which are storing components of like significance being scanned simultaneously, to effect in a single scanning of an element the reading-out of the component stored therein for application to the adder and the writing of a component from the adder into the same elements; first control means connected to said scanning means and operable to cause said scanning means to scan said groups in sequence; second control means connected to said scanning means and operable to repeat the scanning of a group of elements; and means to operate said first and second control means selectively.

9. Data storage apparatus according to claim 8, in which there is provided a least one further storage device and means to select two of the devices for connection to the adder.

10. Data storage apparatus according to claim 8, including means operable to feed a filler digit into said adder in response to the addition of the digits from said two devices by said adder.

References Cited

UNITED STATES PATENTS

| | | | |
|---|---|---|---|
| 2,802,203 | 8/1957 | Stuart-Williams | 340—174 |
| 2,993,196 | 7/1961 | Hughes et al. | 340—174 |
| 3,075,183 | 1/1963 | Warman et al. | 340—174 |

BERNARD KONICK, *Primary Examiner.*

JAMES W. MOFFITT, IRVING SRAGOW, *Examiners.*